(12) United States Patent
Baker (10) Patent No.: US 9,764,617 B2
(45) Date of Patent: Sep. 19, 2017

(54) AIR VENT AND METHOD OF CONTROL THEREOF

(75) Inventor: Roger Baker, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 707 days.

(21) Appl. No.: 14/343,628

(22) PCT Filed: Sep. 7, 2012

(86) PCT No.: PCT/EP2012/067497
§ 371 (c)(1),
(2), (4) Date: Mar. 27, 2014

(87) PCT Pub. No.: WO2013/034679
PCT Pub. Date: Mar. 14, 2013

(65) Prior Publication Data
US 2014/0227958 A1  Aug. 14, 2014

(30) Foreign Application Priority Data

Sep. 7, 2011 (GB) .................................. 1115434.1

(51) Int. Cl.
*B60H 1/34* (2006.01)
*B60H 1/00* (2006.01)

(52) U.S. Cl.
CPC ....... *B60H 1/0075* (2013.01); *B60H 1/00842* (2013.01); *B60H 1/34* (2013.01); *B60H 1/3414* (2013.01)

(58) Field of Classification Search
CPC .... B60H 1/0075; B60H 1/00842; B60H 1/34; B60H 1/3414

(Continued)

(56) References Cited

U.S. PATENT DOCUMENTS 4,389,014 A * 6/1983 Chow ..................... F23N 3/085
126/285 B
4,559,868 A  12/1985 Nonaka et al.
(Continued)

FOREIGN PATENT DOCUMENTS

CN  102133850 A  7/2011
DE   3509537 A1  9/1986
(Continued)

OTHER PUBLICATIONS

International Search Report for PCT/EP2012/067497, dated Jan. 28, 2013, 5 pages.
(Continued)

*Primary Examiner* — Helena Kosanovic
(74) *Attorney, Agent, or Firm* — Reising Ethington P.C.

(57) ABSTRACT

Embodiments of the invention provide air conditioning system for use in a motor vehicle, the air conditioning system comprising a controller, at least one primary vent and an air delivery apparatus for location in a dashboard of a motor vehicle, the apparatus comprising: at least one secondary vent; and means for moving the at least one secondary vent between a retracted position in which the at least one secondary vent lies rearward of an A surface of the dashboard and a deployed position in which the at least one secondary vent is exposed for delivery of air to a zone of the vehicle, the controller being operable to: control the air conditioning system to provide a flow of air from the at least one primary vent while the air delivery apparatus is in a retracted position; and control the at least one vent to assume the deployed position responsive to a demand for a flow of air from the at least one secondary vent.

22 Claims, 8 Drawing Sheets

(58) Field of Classification Search
USPC .................................................. 454/155
See application file for complete search history.

(56) References Cited

U.S. PATENT DOCUMENTS

| | | | |
|---|---|---|---|
| 5,337,802 | A | 8/1994 | Kajino et al. |
| 7,217,185 | B2 | 5/2007 | Metz |
| 8,424,947 | B2 | 4/2013 | Pandura et al. |

FOREIGN PATENT DOCUMENTS

| | | | |
|---|---|---|---|
| DE | 10152480 A1 | 5/2003 | |
| EP | 1559598 A1 | 8/2005 | |
| FR | 2819756 A1 | 7/2002 | |
| FR | 2831109 A1 | 4/2003 | |
| GB | 2139749 A | 11/1984 | |
| JP | S59145412 U | 9/1984 | |
| JP | S59171710 A | 9/1984 | |
| JP | S61142621 U | 9/1986 | |
| JP | H0292311 U | 7/1990 | |
| JP | H0522115 U | 3/1993 | |
| JP | 2004203090 A | 7/2004 | |
| JP | 2005022531 A | 1/2005 | |
| JP | 2005518976 A | 6/2005 | |
| JP | 2005306327 A | 11/2005 | |
| JP | 2007216894 A | 8/2007 | |
| JP | 2008056005 A | 3/2008 | |
| JP | 2008056006 A | 3/2008 | |

OTHER PUBLICATIONS

Combined Search and Examination Report for application No. GB1115434.1 dated Nov. 24, 2011, 2 pages.
English translation of Japanese Office action corresponding to application No. 2014-528988, dated Mar. 10, 2015, 2 pages.
Combined Search and Examination report corresponding to application No. GB1215974.5, dated Dec. 21, 2012, 6 pages.
English translation of Chinese Office action corresponding to application No. 201280054697.X, dated Jul. 23, 2015, 10 pages.

\* cited by examiner

AIR VENT AND METHOD OF CONTROL THEREOF

FIELD OF THE INVENTION

The present invention relates to an air vent for a motor vehicle and to a method of controlling an air vent. Aspects of the invention relate to an apparatus, to a controller, to a vehicle and to a method.

BACKGROUND

It is known to provide a heating, ventilation and air conditioning (HVAC) system in a motor vehicle although some motor vehicles are not provided with air conditioning (AC) functionality.

Known motor vehicle ventilation systems are operable to provide a flow of air into a cabin of the vehicle. Air may be delivered to one or more of a front footwell zone, a front facial zone (to one or more front seat occupants) and a front windscreen zone. The facial zone is typically serviced by a pair of side vents and a pair of centre air vents. The side vents are located at opposite (left and right) extremes of an instrument panel or dashboard of the vehicle whilst the centre vents are located in a central area of the panel. The instrument panel may also be referred to as a fascia.

One or more controls are typically provided for controlling the relative amounts of air that flow through the vents associated with each zone. Furthermore, the vents serving the facial zone may be operable to adjust a direction in which air flows from the vents into the facial zone.

SUMMARY

According to one aspect of the invention there is provided an air conditioning system for use in a motor vehicle, the air conditioning system comprising a controller, at least one primary vent and an air delivery apparatus for location in a dashboard of the motor vehicle, the apparatus comprising:
  at least one secondary vent; and
  means for moving the at least one secondary vent between a retracted position in which the at least one secondary vent lies rearward of an A surface of the dashboard and a deployed position in which the at least one secondary vent is exposed for delivery of air to a zone of the vehicle,
  the controller being operable to:
  control the air conditioning system to provide a flow of air from the at least one primary vent while the air delivery apparatus is in a retracted position; and
  control the at least one vent to assume the deployed position responsive to a demand for a flow of air from the at least one secondary vent.

In this way the invention provides an air conditioning system in which a primary vent can provide air flow with or without a secondary vent. The secondary vent can be moved into a deployed position and provide air flow when required.

In describing the position of the secondary vent, the word rearward is not a reference to the direction of facing of the vehicle, but only of the direction of facing of the A surface. As such, when in a retracted position, the secondary vent may lie forward of an A surface with respect to the vehicle. The at least one secondary vent may lie below the A surface of the dashboard while in the retracted position. A surface of the at least one secondary vent may lie substantially flush with the A surface of the dashboard while in the retracted position.

It may be that the at least one primary vent is a fixed vent.

By A surface is meant a surface of the dashboard that is visible to a user in normal use, i.e. the surface that is exposed to the interior cabin environment of the vehicle. An A surface of the dashboard may for example be provided by a trim panel. Thus reference to an A surface of the dashboard may also be considered to be reference to an outer surface of the dashboard.

It is to be understood that reference to moving the at least one secondary vent includes movement by translation with no rotation of the at least one vent, rotation with no translation and movement in which the at least one vent is subject to both rotation and translation.

Advantageously the deployed position is a position in which the at least one secondary vent lies forward of the A surface.

By forward is included above the A surface, i.e. above and not behind the outer surface of the dashboard.

The apparatus may be arranged to be concealed behind the dashboard when in the retracted condition.

The apparatus may comprise a cover portion, the cover portion providing a portion of the A surface of the dashboard, the cover portion being arranged to move with the at least one vent.

Advantageously in the retracted position of the at least one secondary vent the cover portion at least partially conceals the apparatus.

Further advantageously in the retracted position of the at least one secondary vent the cover portion conceals the apparatus substantially entirely.

Optionally the cover portion is coupled to a portion of the apparatus.

Advantageously the cover portion comprises a trim panel.

Alternatively the cover portion is integrally formed with the apparatus.

The means for moving the at least one secondary vent may comprise a pivot arrangement.

The apparatus may comprise a vent carrier member arranged to bear the at least one secondary vent, the carrier member being hingedly coupled to a vent substrate member, the substrate member being arranged to be coupled to a portion of the motor vehicle.

Advantageously the means for moving the at least one secondary vent comprises an actuator, the apparatus comprising clutch means arranged to allow the secondary vent to swing from the deployed position to the retracted position responsive to application of pressure to the apparatus without requiring actuation of the actuator.

This feature has the advantage that damage to the apparatus may be prevented in the event a load is placed on the apparatus that might otherwise cause damage.

Further advantageously the apparatus comprises switch means operable by a user to cause the at least one secondary vent to assume the retracted condition.

This feature has the advantage that the user may force retraction of the at least one secondary vent following deployment thereof.

The switch means may be operable by application of downward pressure on the apparatus.

Thus if a user may conveniently retract the at least one secondary vent when required. This feature has the advantage that if the user places an object on the apparatus that is sufficiently heavy to actuate the switch the apparatus will close. Thus the apparatus anticipates that a user may find it more convenient if the at least one vent were closed.

The controller may be operable to control the apparatus to remain in the deployed condition when air is no longer required to be delivered through the at least one secondary vent responsive to a value of at least one selected from an outside air temperature and a solar load on the vehicle.

This feature has the advantage that apparatus may be controlled in such a manner that the likelihood the apparatus is switched between retracted and deployed conditions repeatedly during the course of a journey may be reduced.

Thus if the controller determines that the vehicle is subject to a relatively high thermal load, for example due to a high ambient air temperature or a high solar load the controller may determine that the apparatus should remain in the deployed condition since it is likely the apparatus will be required to deliver cooled air to the vehicle cabin again within a relatively short time period.

If the controller determines the outside air temperature is relatively low and the solar load is low the vehicle may be configured to determine that the apparatus may be required to deliver heated air to the cabin within a relatively short time period and therefore maintain the apparatus in the deployed condition.

The controller may be operable to control the apparatus to remain in the deployed condition when air is no longer required to be delivered through the at least one vent responsive to a value of an average flow rate of air through the at least one vent since the apparatus was deployed.

The controller may be operable to control the apparatus to switch between retracted and deployed conditions responsive to a value of required flow rate of air to a facial zone of the cabin.

Advantageously the apparatus is configured to provide a flow of air to the facial zone of the cabin when a required flow rate of air exceeds that which can be provided through a primary vent operable to deliver air to the facial zone.

The primary vents may include for example one or more side vents and optionally one or more screen vents.

Thus if the one or more primary vents are unable to deliver a required flow of air to the facial zone the controller may be arranged to control the apparatus to deliver a required flow of air to the facial zone.

In a still further aspect of the invention there is provided a motor vehicle comprising a system according to another aspect of the invention.

The apparatus is advantageously coupled to a dashboard of the motor vehicle.

According to a further aspect of the invention there is provided a method of delivering air to a cabin of a motor vehicle, the method comprising:

providing a controller, at least one primary vent and at least one secondary vent;

controlling the at least one primary vent to provide a flow of air while the air delivery apparatus is in a retracted position in which the at least one secondary vent lies rearward of an A surface of a dashboard of the vehicle; and moving the at least one secondary vent between a retracted position and a deployed position in which the at least one secondary vent is exposed for delivery of air to a zone of the vehicle, responsive to a demand from the controller for a flow of air from the at least one secondary vent.

The at least one secondary vent may lie below the A surface of the dashboard while in the retracted position. A surface of the at least one secondary vent may lie substantially flush with the A surface of the dashboard while in the retracted position.

It may be that the at least one primary vent is a fixed vent.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments, except where there is incompatibility of features.

BRIEF DESCRIPTION OF THE DRAWINGS

Embodiments of the invention will now be described, by way of example only, with reference to the accompanying figures in which.

DETAILED DESCRIPTION

Figure 1:
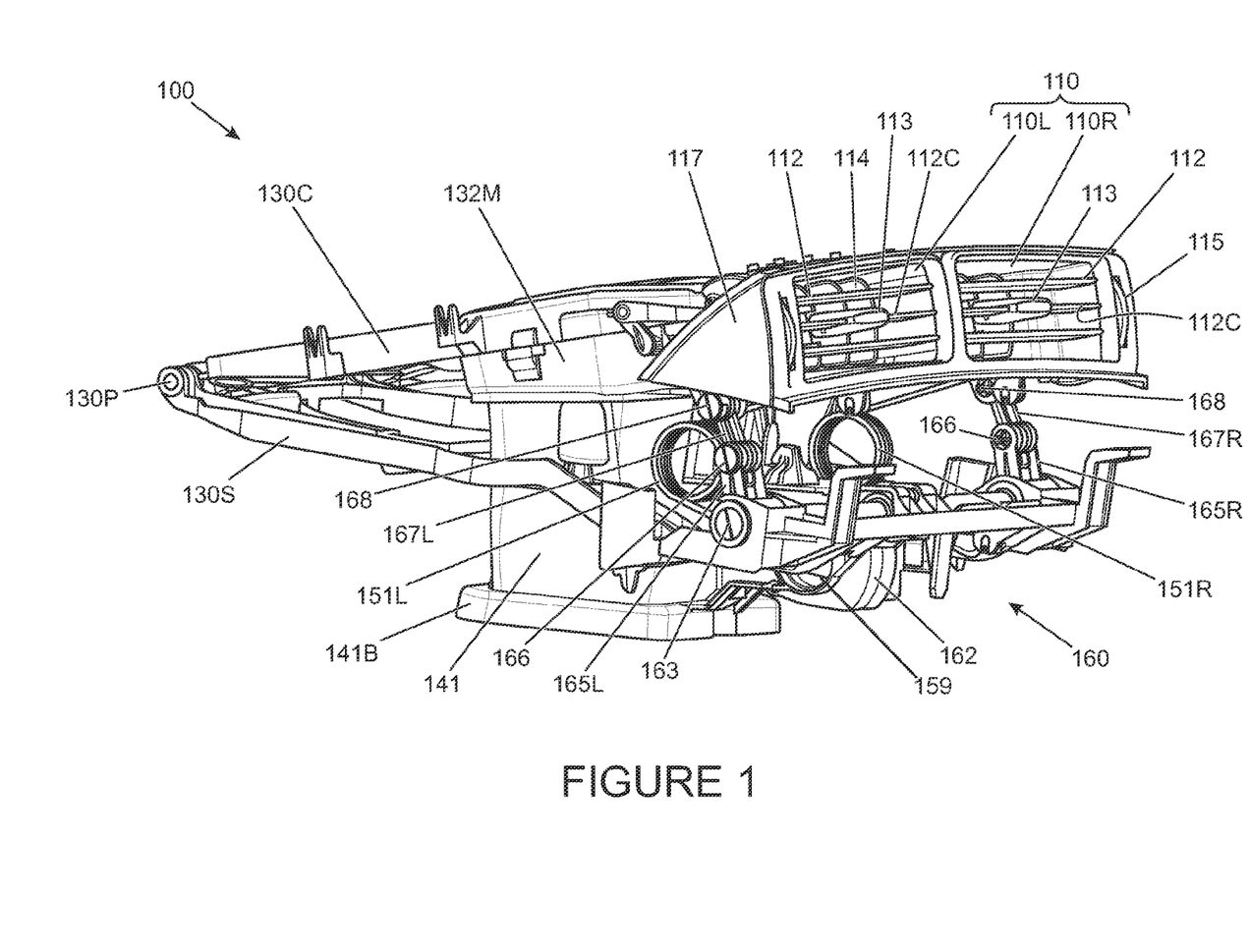
FIG. 1 is a perspective view of apparatus according to an embodiment of the present invention in a deployed condition.

FIG. 1 shows active vent apparatus 100 according to an embodiment of the present invention. The apparatus 100 has a pair of air vents 110 operable to deliver air into a cabin of a motor vehicle 1. A left air vent 110L is arranged to direct air to a left front seat occupant of the vehicle 1 whilst a right air vent 110R is arranged to direct air to a right front seat occupant.

The vents 110 are supported by a vent carrier 130C. The vent carrier 130C is in the form of a panel having the vents 110 coupled thereto at one end. At the opposite end the carrier 130C is coupled to vent substrate 130S by means of a pivot hinge 130P.

Figure 2:
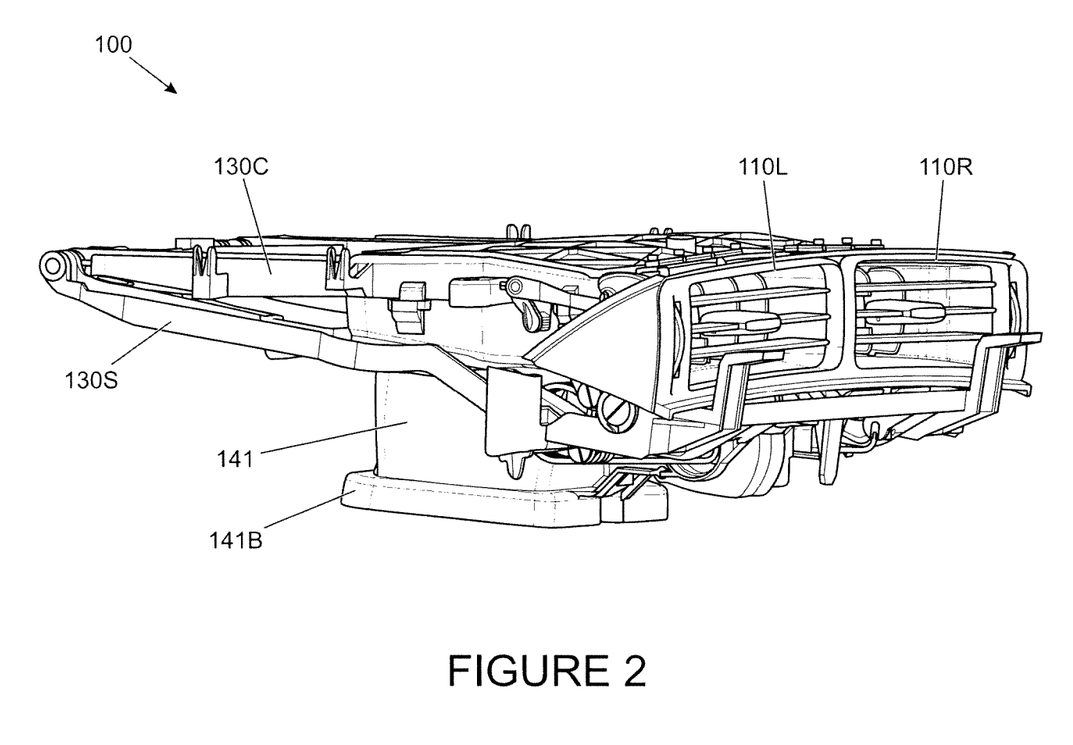
FIG. 2 is a perspective view of the apparatus of FIG. 1 in a retracted condition.

The vent substrate 130C is arranged to be fixedly coupled to a portion of a dashboard 5 of the vehicle 1 as shown in FIG. 2 (not shown in FIG. 1 for clarity). Thus the vent carrier 130C is operable to swing away from or towards the dashboard 5 about the pivot hinge 130P. The apparatus is shown in FIG. 1 in a deployed condition in which the vent carrier 130C is at an extreme of swing away from the vent substrate 130S. FIG. 2 is a corresponding image showing the apparatus 100 in a retracted condition in which the vent carrier 130C is at an extreme of swing towards the vent substrate 130S.

The vent substrate 130S has a lower air conduit 141 coupled thereto, the lower air conduit 141 having a basal portion 141B that is arranged to be coupled to a heating, ventilation and air conditioning (HVAC) unit 50 of the vehicle 1. The HVAC unit 50 is arrange to deliver a flow of air to the apparatus 110 when required.

The lower air conduit 141 is arranged to direct air entering the conduit 141 to an inlet of each of a pair of upper air conduits 132L, 132R (FIG. 3) that are coupled to the vent carrier 130C. The upper conduits 132L, 132R are coupled to the left and right air vents 110L, 110R respectively and arranged to direct air therethrough.

Figure 3:
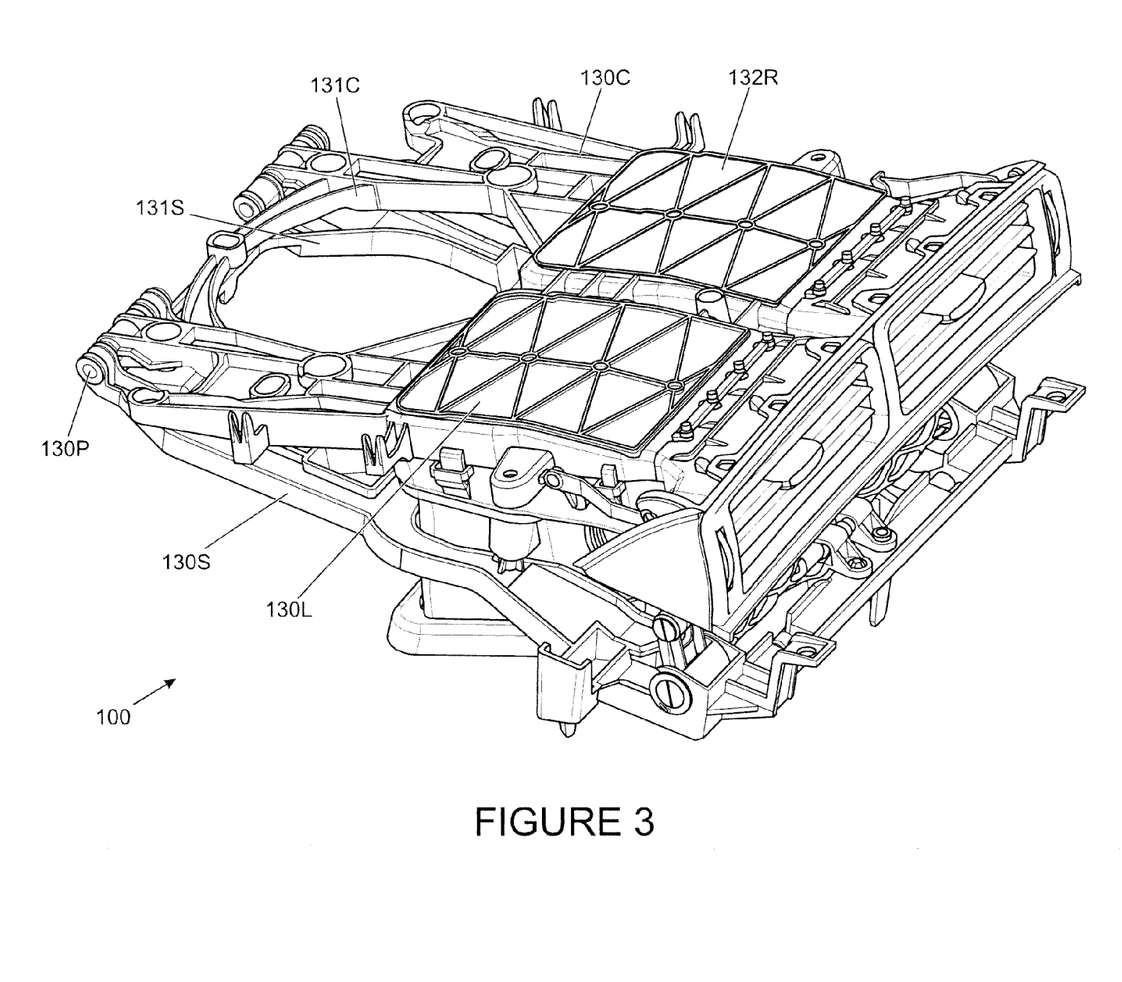
FIG. 3 is a perspective view of the apparatus of FIG. 1 from above.

Since the vent carrier 130C is pivotably movable with respect to the vent substrate 130S, the upper air conduits 132L, 132R are coupled to a manifold 132M defining a skirt around the lower air conduit 141. As the vent carrier 130C pivots towards and away from the vent substrate 130S about the pivot hinge 130P, the manifold 132M moves alternately downwardly and upwardly around the lower air conduit 141.

In the arrangement shown the manifold 132M is arranged to form a seal around the lower air conduit 141 when the apparatus 100 is in the deployed condition. In some embodiments the manifold 132M is arranged to form a seal around the lower air conduit 141 when the apparatus 100 is in the deployed or retracted condition. In some embodiments the manifold 132M is arranged to form a seal around the lower air conduit 141 when the apparatus is in the deployed or retracted condition and for substantially all positions of the manifold 132M between the deployed and retracted conditions.

The vent carrier 130C is arranged to be swung between the retracted and deployed positions by a lift mechanism 160 driven by an actuator such as a stepper motor 162.

The stepper motor 162 is arranged to rotate a drive bar 163 that is oriented parallel to the pivot hinge 130P but at a forward end of the vent substrate 130S opposite that at which the pivot hinge 130P is located. The drive bar 163 lies in a lateral orientation across a width of the apparatus 100. Left and right lower lift arms 165L, 165R are fixedly coupled to the drive bar 163 at opposite ends thereof, one below the left vent 110L and one below the right vent 110R. Thus the lower lift arms 165L, 165R are arranged to rotate with the drive bar 163.

The lower lift arms 165L, 165R are each coupled by means of a respective hinge pivot 166 to left and right upper lift arms 167L, 167R, respectively. The upper lift arms 167L, 167R are in turn coupled to respective locations of the vent carrier 130C by means of further respective pivot hinges 168.

It is to be understood that rotation of the drive bar 163 about a longitudinal axis thereof causes rotation of the lower lift arms 165L, 165R with the drive bar 163. This causes the upper lift arms 167L, 167R to rotate about pivot hinges 166 and in turn pivot hinges 168. Thus by rotation of the drive bar 163 in alternate opposite directions the vent carrier 130C may be moved between the retracted and deployed positions as required.

In some embodiments the lift mechanism 160 may provide an over centre cam arrangement.

In the embodiment shown the apparatus 100 is arranged whereby if sufficient force is placed on the vent carrier 130C when the carrier 130C is in the deployed position, a clutch mechanism 159 allows the carrier 130C to swing towards the retracted position. This feature has the advantage that if an unexpectedly high force is applied to the vent carrier 130C in a downward direction, for example if a sufficiently heavy weight is placed on the carrier 130C, the carrier 130C will move towards the retracted position preventing damage to the lift mechanism 160.

If the carrier 130C is unable to open when the stepper motor 162 is actuated, the clutch mechanism 159 similarly allows slip of the motor 162 to prevent damage to the lift mechanism 160.

A pair of damper elements 151L, 151R are provided for damping vibration of the apparatus 100 and assisting smooth movement of the vent carrier 130C between the retracted and deployed positions. The elements 151L, 151R are provided on respective left and right sides of the apparatus 100 and are in the form of a pair of lever arms hingedly coupled together by means of a resilient hinge arrangement. Respective lever arms of each element 151L, 151R are arranged to abut facing portions of the vent substrate 130S and vent carrier 130C to urge the substrate 130S and carrier 130C away from one another, i.e. to urge the apparatus 100 towards the deployed condition. In the embodiment shown the elements 151L, 151R are each formed from a single length of wire, having a central portion wound into the form of a coil spring.

Figure 4:
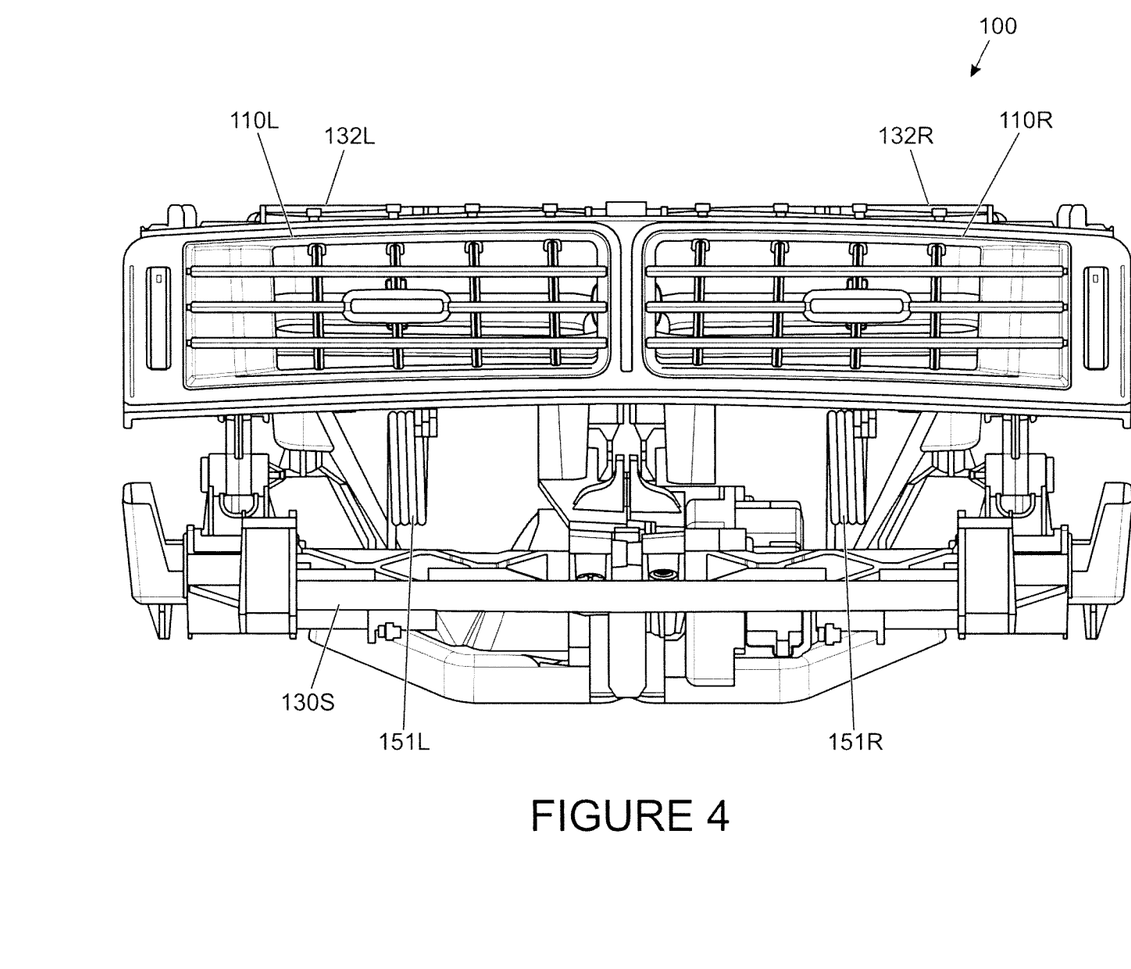
FIG. 4 is a front view of the apparatus of FIG. 1 in the deployed condition.

The air vents 110 themselves are provided with respective sets of pivotable louvre slats 112, 114. A first set of slats 112 are pivotable about a substantially horizontal axis and allow the occupant to control an angle of elevation of airflow from respective vents 110. A second set of slats 114 behind the first set 112 allow the occupant to control a lateral (left/right) direction of airflow from the vent 110. The respective sets of slats 112, 114 are movable by means of wheels 115 (slats 112) and slide controls or levers 113 (slats 114). The levers 113 are slidably coupled to a central slat 112C of the first set of slats along which they may be slid in order to effect rotation of the second set of slats 114.

The vent substrate 130S is provided with an aperture 131S therethrough to which an audio speaker may be mounted. This feature allows the distance between the pivot hinge 130P and air vents 110 to be made relatively large without requiring relocation of the speaker. A corresponding aperture 131C in the vent carrier 130C allows sound from the speaker to pass therethrough with reduced attenuation. A speaker grille may be coupled to the carrier 130C to cover the aperture 131C. In some embodiments the speaker may be coupled to the carrier 130C instead of the substrate 130S.

It can be seen from FIG. 1 that the vent carrier 130C is constructed so as to define a relatively large lever arm between the hinge pivot 130P and vents 110. This feature has the effect of reducing an angle through which the air vents 110 must rotate about pivot hinge 130P when the apparatus 100 moves between the retracted and deployed conditions. It is to be understood that pivot hinge 130P is arranged to lie parallel to a lateral axis of the vehicle 1. The reduction in angle through which the air vents 110 must rotate can enhance an enjoyment by an occupant of the vehicle 1 of the theatre of air vent 110 deployment and retraction.

Figure 5:
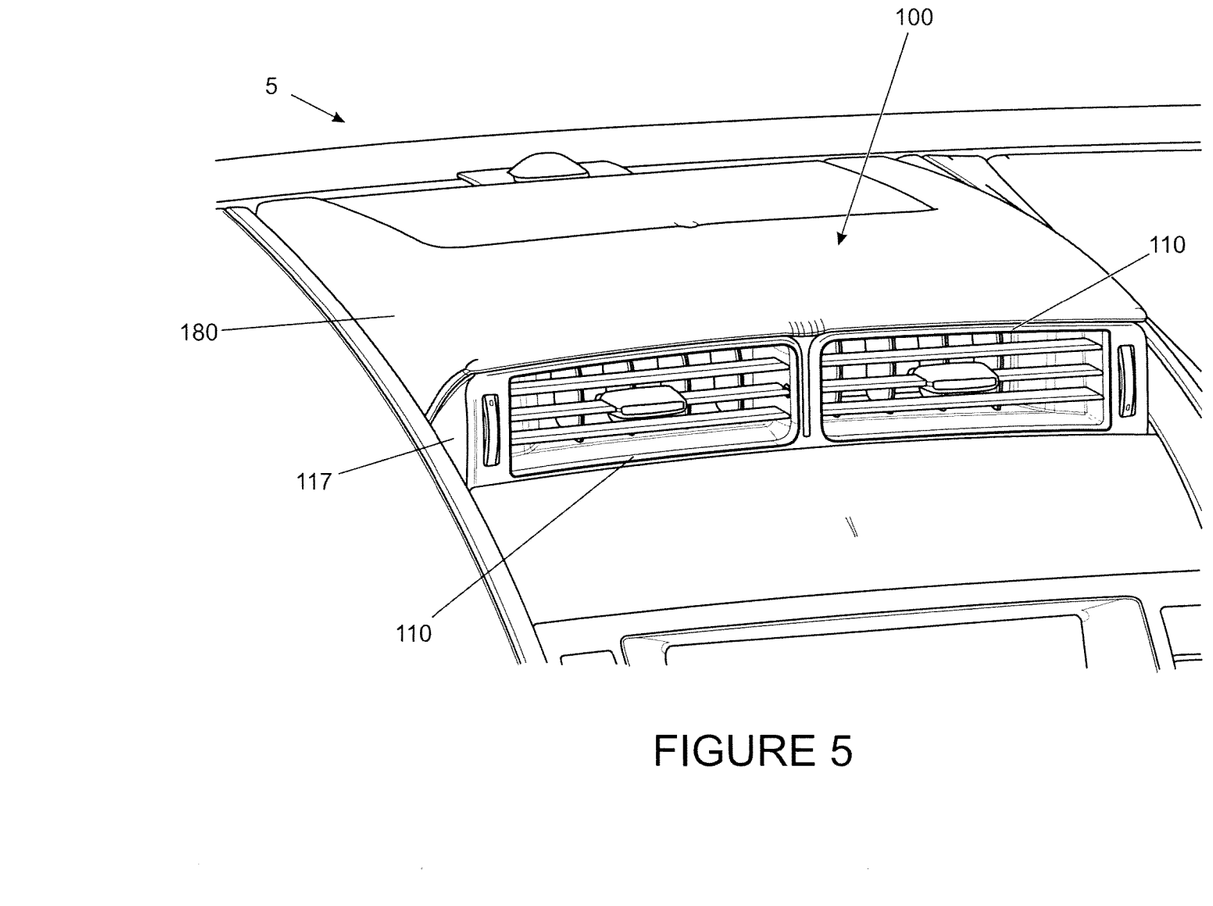
FIG. 5 is a perspective view of the apparatus of FIG. 1 installed in a dashboard of a motor vehicle in the deployed condition.

Furthermore, this feature can enhance an aesthetic appeal of the apparatus 100 when in the deployed condition since relatively abrupt changes in a shape of the dashboard rearward of the apparatus 110 (as viewed by a vehicle occupant) may be eliminated in some embodiments, such as that of FIG. 5.

FIG. 5 shows the apparatus installed in a central region of a dashboard 5 of a motor vehicle 1, the apparatus 100 being in the deployed condition in the configuration of FIG. 5. Because the vents 110 are positioned centrally of the dashboard the vents 110 may also be referred to as centre vents 110.

The vents 110 are provided with upright side trim panels 117 along their outer sides. A cover trim panel 180 is coupled to the vent carrier 130C to conceal the carrier 130C and other portions of the apparatus 100 except for the vents 110 and side trim panels 117 when in the deployed configuration. In the example shown, the cover trim panel 180 is covered with materials complementary to those used in the surrounding instrument panel or dashboard 5 so as to enhance the overall appearance of the vehicle interior.

Figure 6:
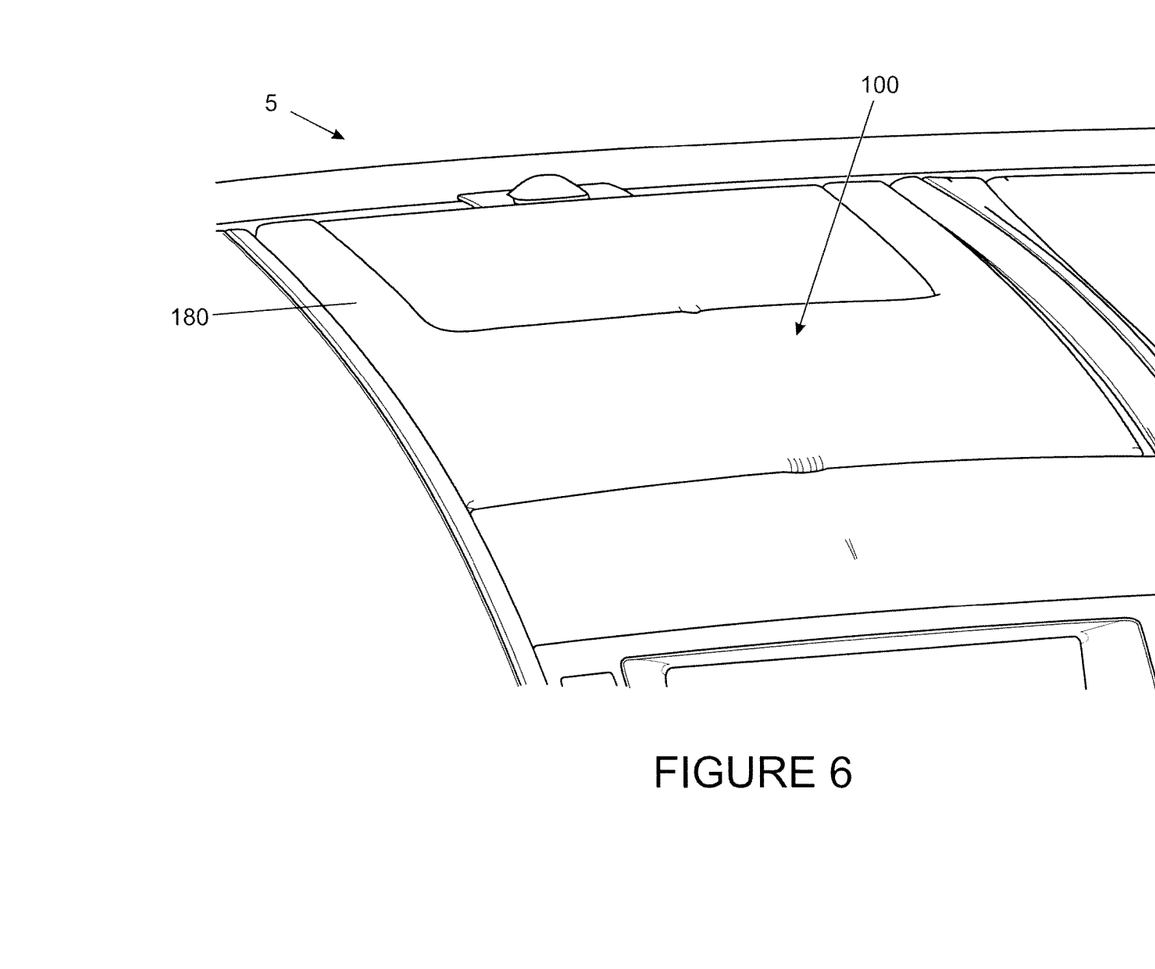
FIG. 6 is a perspective view of the apparatus of FIG. 1 installed in a dashboard of a motor vehicle in the retracted condition.

FIG. 6 is a corresponding view of the dashboard 5 with the apparatus 100 in the retracted condition. It can be seen that when in the retracted condition the apparatus 100 is completely concealed except for the cover trim panel 180.

The apparatus 100 is positioned such that when in the deployed condition the apparatus 100 may deliver a flow of air to a front upper body (or facial) zone of the vehicle 1.

Figure 7:
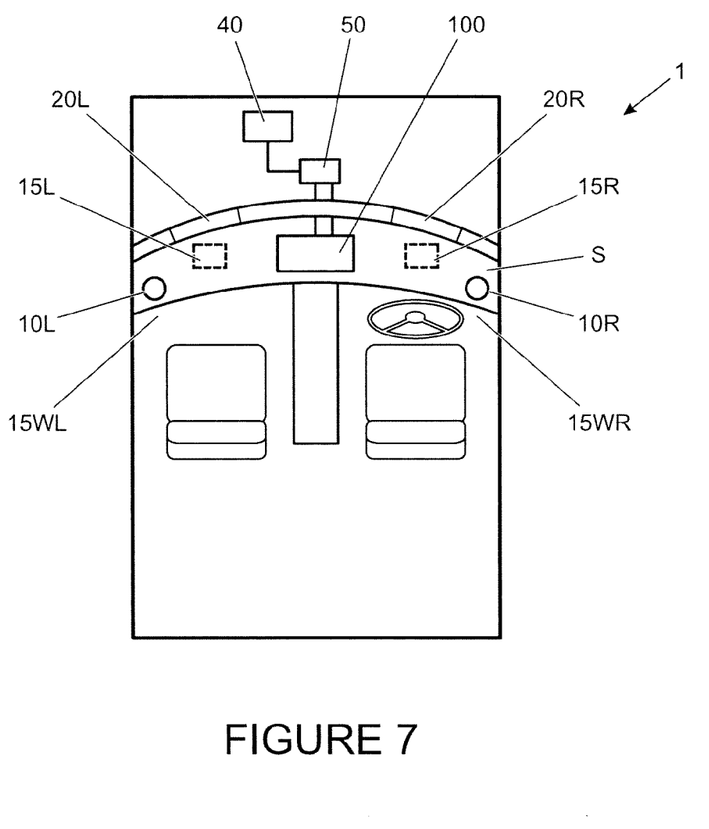
FIG. 7 is a plan view of a motor vehicle having the active vent apparatus of FIG. 1 installed therein.

FIG. 7 is a schematic plan view of the vehicle 1 showing the location of further vents of the vehicle 1.

The dashboard 5 has a pair of side vents 10L, 10R arranged to provide air to front side facial zones of the vehicle 1, the side vents 10L, 10R being located in the dashboard 5 on respective opposite sides of the vehicle 1. In the embodiment of FIG. 7 the side vents 10L, 10R are not retractable but are permanently deployed. In some embodiments the side vents 10L, 10R may also be retractable. A pair of foot vents 15L, 15R are provided below the dashboard 5 in respective left and right footwells 15WL, 15WR of the vehicle 1, the foot vents 15L, 15R being operable to deliver a flow of air to a front foot zone of the vehicle 1. A pair of screen vents 20L, 20R are operable to deliver a flow of air to respective left and right portions of a windscreen of the vehicle 1.

The apparatus 100 is arranged to be controlled by means of an HVAC controller 40. The controller 40 is arranged to control the apparatus 100 to assume the retracted or deployed conditions and to control a flow rate of air through the vents 110 when the apparatus 100 is in the deployed condition.

The HVAC controller 40 is operable to deliver a flow of air through the screen vents 20L, 20R alone, the foot vents 15L, 15R alone, through the foot vents 15L, 15R and the side vents 10L, 10R simultaneously and not through the centre vents 110, through the foot vents 15L, 15R, side vents 10L, 10R and centre vents 110 simultaneously or through side vents 10L, 10R and centre vents 110. Other arrangements are also useful.

If the apparatus 100 is in the retracted condition and the controller 40 determines that airflow is required to the facial zone of the vehicle 1, the controller 40 maintains the apparatus 100 in the retracted condition if the required ratio of airflow between the facial zone and foot zone is below a prescribed value. The controller 40 bleeds air through the side vents 10L, 10R in order to deliver the required flow to the facial zone.

However if the required ratio exceeds the prescribed value the controller 40 controls the apparatus 100 to assume the deployed condition and opens a valve between the HVAC unit 50 and the lower air conduit 141 in order to allow airflow through the apparatus 100. In some embodiments, in order to prevent unwanted NVH (noise, vibration and harshness) such as whistling, the controller 40 may be arranged to control the apparatus to assume the deployed condition before allowing air to enter the lower conduit 141.

It is to be understood that an aim of some embodiments is to reduce the number of times the apparatus 100 is required to move between the retracted and deployed conditions during the course of a journey. As described above, one way of accomplishing this is by bleeding air through the side vents 10L, 10R to provide air flow to the front facial zone when relatively low flow rates of air are to be delivered to the facial zone.

In some embodiments the controller 40 is operable to balance airflow between the side vents 10L, 10R and the screen vents 20L, 20R as an alternative to controlling the apparatus 100 to assume the deployed condition as the amount of air to be delivered to the facial zone increases. Once the required flow rate of air to the facial zone exceeds an amount that is to be delivered through the side and screen vents the apparatus 100 may be controlled to assume the deployed condition.

A further method of reducing movement is to implement a hysteresis in respect of when the controller 40 changes the ratio of airflow between the facial and foot zones.

The controller 40 is configured to determine a value of a parameter S responsive to which the controller 40 determines the relative distribution of airflow between the screen, facial zone and foot zone of the vehicle 1. The controller 40 also determines whether the active vent apparatus 100 should assume the retracted or deployed conditions responsive to the value of S.

Figure 8:
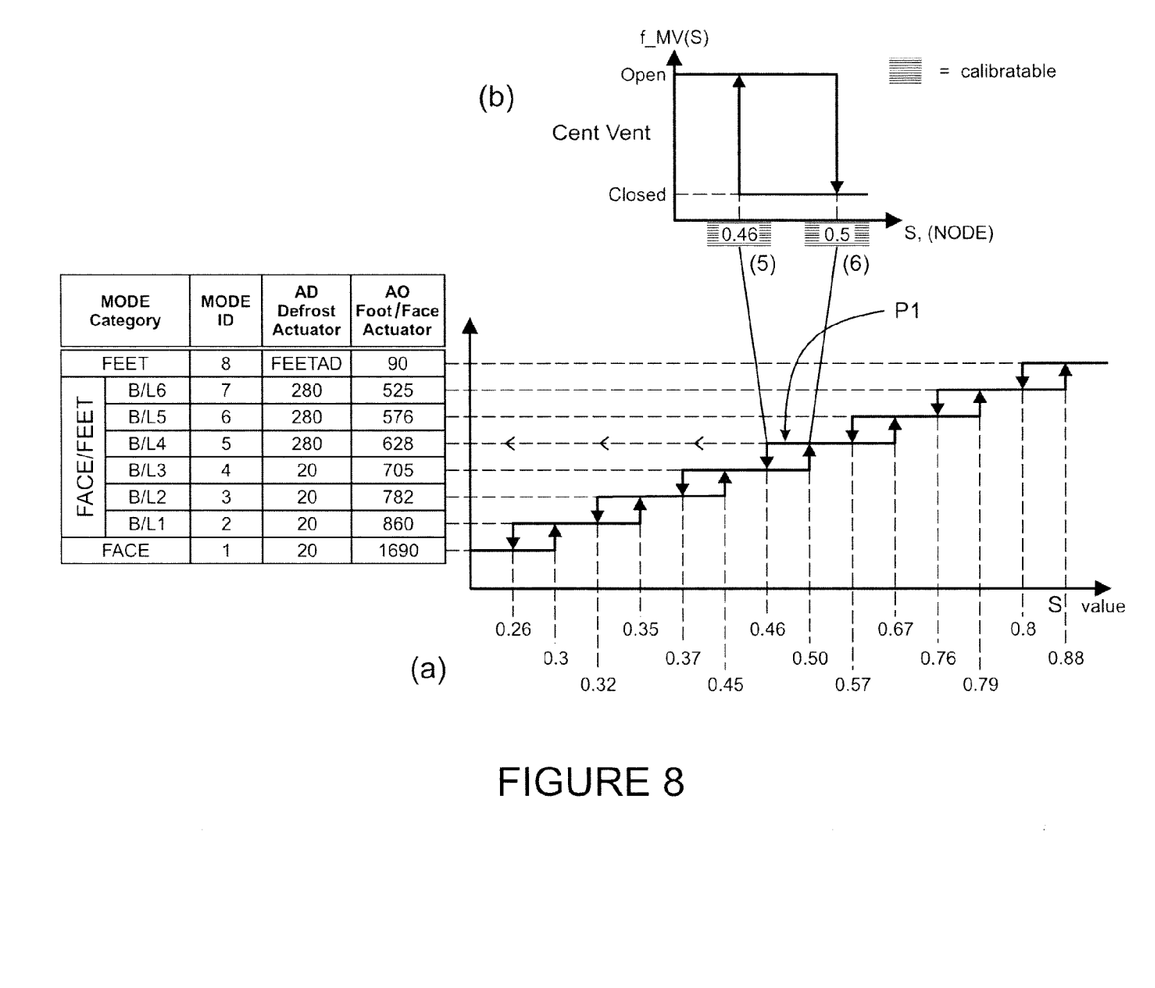
FIG. 8 illustrates schematically (a) a relationship between an S parameter and a selected HVAC system mode of the vehicle and (b) a relationship between the selected HVAC system mode and the condition of the active vent apparatus.

FIG. 8(a) lists eight discrete modes the HVAC controller 40 may control the vehicle to assume in respect of airflow delivery. The modes are:

1. Face mode (airflow only to the facial zone of the vehicle);
2. Face/foot mode B/L 1 (airflow primarily to the facial zone with bleed flow to the foot zone);
3. Face/foot mode B/L 2 (airflow primarily to the facial zone with more air flow to the foot zone than B/L 1, the ratio of airflow rates to the facial/foot zones being lower than that of mode 2, i.e. more airflow is provided to the foot zone relative to that to the facial zone when in mode 3);
4. Face/foot mode B/L 3 (airflow to the facial and foot zones, the ratio of airflow rates to the facial/foot zones being lower than that of mode 3);
5. Face/foot mode B/L 4 (airflow to the facial and foot zones, the ratio of airflow rates to the facial/foot zones being lower than that of mode 4);
6. Face/foot mode B/L 5 (airflow primarily to the foot zone, the ratio of airflow rates to the facial/foot zones being lower than that of mode 5);
7. Face/foot mode B/L 6 (airflow primarily to the foot zone with bleed airflow to the facial zone, the ratio of airflow rates to the facial/foot zones being lower than that of mode 6); and
8. Foot mode (airflow only to the foot zone of the vehicle).

The abbreviation B/L refers to bi-level flow.

The values shown in columns AD and AO of FIG. 8(a) refer to the positions of respective valve actuators, for example position values of respective stepper motors. Actuator AD is a defrost actuator arranged to control the position of a valve operable to control flow of air through screen vents 20L, 20R. Actuator AO is arranged to control the position of a valve operable to determine the ratio of airflow rates between the foot and facial zones.

The controller 40 is arranged whereby if the controller 40 has controlled the vehicle to assume mode 6 or higher, the active vent apparatus 100 assumes the retracted condition. This condition may be referred to as a 'centre vent closed' (CVC) condition as shown in FIG. 8(b). If the controller 40 subsequently controls the HVAC system to assume mode 5, the controller 40 controls the active vent apparatus 100 to assume the deployed condition. This condition may be referred to as a 'centre vent open' (CVO) condition. This transition is illustrated in FIG. 8(b).

If the controller subsequently controls the HVAC system to assume mode 6, the controller controls the active vent apparatus to assume the CVC condition.

The controller 40 is configured to compute a value of a parameter S responsive to one or more vehicle cabin temperatures and a solar load on the vehicle 1. The controller 40 controls the HVAC system to assume one of modes 1 to 8 responsive to the value of S.

FIG. 8(a) illustrates the relationship between the value of the parameter S and the mode assumed by the HVAC system. It can be seen that the controller 40 implements hysteresis functionality in respect of transitions between modes responsive to the value of S. That is, a threshold value of S for a transition from a first mode to the next higher mode is greater than the threshold value for a transition from that next higher mode back to the first mode. Similarly, the threshold value of S for a transition from a first mode to the next lower mode is lower than the threshold value for a transition from that next lower mode back to the first mode.

By way of example and by reference to FIG. 8(a), suppose the controller 40 determines the value of S to be 0.48. It can be seen that this value corresponds to position P1 of the mode map shown on the right hand side of FIG. 8(a). This value may be seen to correspond to mode 5 (left hand portion of the table) as indicated by the arrowheads superimposed on the figure. For the avoidance of doubt it is stated that values of S recited herein are calibratable depending on a given system configuration.

It can be seen that in mode 5, the actuator AD is controlled to assume position 280 and actuator AO is controlled to assume position 628.

If the value of S falls, the solid line passing through S=0.48 remains at a level corresponding to mode 5 until the value of S falls below 0.46, when the line falls to a level indicating mode 4 should be assumed. In mode 4 actuator AD is controlled to assume position 20 and actuator AO is controlled to assume position 705.

If the value of S subsequently rises above 0.46, it can be seen that this solid line remains at a level corresponding to mode 4 until S rises above 0.50, when the line transitions to a level corresponding to mode 5.

Thus the controller 40 is configured to reduce a risk that mode chatter occurs, i.e. the HVAC system is controlled to fluctuate repeatedly between modes in rapid succession. This has the advantage that driver irritation and potential distraction in respect of deployment and retraction of the active vent apparatus 100 may be reduced.

In some embodiments the controller 40 is configured to respond relatively quickly to a demand for air flow to a facial zone of the vehicle 1, controlling the apparatus 100 to assume the CVO condition relatively quickly in response to airflow demand. However the controller 40 may be configured to retain the apparatus in the CVO condition once the value of S has risen to a value at which airflow through the apparatus 100 is no longer required. The HVAC system may therefore be controlled to terminate flow of air through the apparatus 100 but to retain the apparatus in the CVO condition. This has the advantage that a risk that the apparatus 100 transitions between CVC and CVO conditions repeatedly is reduced as noted above.

In some embodiments the apparatus 100 may be configured to allow bleed airflow therethrough even when in the retracted condition, CVC. For example, the cover 180 may be provided with a vent, for example a low-visibility vent and/or perforations to allow bleed airflow therethrough. When a greater airflow is required than may be achieved by bleed flow the controller 40 may be configured to control the apparatus 100 to assume the CVO condition.

Embodiments of the invention have the advantage that a dashboard 5 of a motor vehicle may be fabricated with enhanced aesthetic appeal. This is because when a user first enters the vehicle 1 when the HVAC system is turned off, the active air vent apparatus will be hidden since it will typically be in the retracted condition. Only when flow of air through the centre vents 110 is required in order to meet cabin comfort requirements will the vents 100 become visible. The theatre associated with vent apparatus 100 opening and closing can also enhance driver enjoyment of the vehicle 1.

It is to be understood that a user interface, which may be via a visual display screen such as a touchscreen, may allow a user to customise one or more functions of the controller 40. For example, the controller 40 may be operable to control the active vent apparatus 100 to assume the deployed condition whenever an engine of the vehicle is switched on, or whenever the vehicle 1 is powered up even if the engine is not on. In some embodiments the controller 40 may be operable to control the apparatus 100 to assume the deployed condition whenever the HVAC system is activated. Other arrangements are also useful.

In some embodiments the apparatus 100 includes control means in the form of a switch 180 by means of which a user may over-ride deployment of the apparatus by pressing downwards on the cover trim panel 180. Thus if the user requires the apparatus 100 to assume the retracted condition the user may simply press downwardly on the panel 180, the apparatus 100 being controlled automatically to assume the retracted condition responsive to actuation of the switch 180.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An air conditioning system for use in a motor vehicle, the air conditioning system comprising a controller, at least one primary vent and an air delivery apparatus for location in a dashboard of the motor vehicle, the apparatus comprising:

at least one secondary vent;
wherein the at least one secondary vent moves between a retracted position in which the at least one secondary vent lies rearward of an A surface of the dashboard and a deployed position in which the at least one secondary vent is exposed for delivery of air to a zone of the vehicle,
the controller being configured to:
control the air conditioning system to provide a flow of air from the at least one primary vent while the at least one secondary vent of the air delivery apparatus is in the retracted position; and
when a required flow rate of air exceeds a predetermined flow rate, control the air conditioning system to provide the flow of air from the at least one primary vent and the at least one secondary vent in the deployed position.

2. An air conditioning system as claimed in claim 1 wherein the at least one primary vent is a fixed vent.

3. An air conditioning system as claimed in claim 1 wherein the deployed position is a position in which the at least one secondary vent lies forward of the A surface.

4. An air conditioning system as claimed in claim 1 wherein the air delivery apparatus is arranged to be concealed behind the dashboard when the at least one secondary vent is in the retracted position.

5. An air conditioning system as claimed in claim 1 wherein the air delivery apparatus comprises a cover portion, the cover portion providing a portion of the A surface of the dashboard, the cover portion being arranged to move with the at least one secondary vent.

6. An air conditioning system as claimed in claim 5 wherein in the retracted position of the at least one secondary vent the cover portion at least partially conceals the apparatus.

7. An air conditioning system as claimed in claim 5 wherein in the retracted position of the at least one secondary vent the cover portion conceals the apparatus substantially entirely.

8. An air conditioning system as claimed in claim 5 wherein the cover portion is coupled to a portion of the apparatus.

9. An air conditioning system as claimed in claim 8 wherein the cover portion comprises a trim panel.

10. An air conditioning system as claimed in claim 5 wherein the cover portion is integrally formed with the apparatus.

11. An air conditioning system as claimed in claim 1 wherein the at least one secondary vent pivots between the retracted and deployed positions.

12. An air conditioning system as claimed in claim 11 comprising a vent carrier member arranged to bear the at least one secondary vent, the carrier member being hingedly coupled to a vent substrate member, the substrate member being arranged to be coupled to a portion of the motor vehicle.

13. An air conditioning system as claimed in claim 1 wherein the apparatus comprises an actuator and a clutch, the clutch being arranged to allow the at least one secondary vent to swing from the deployed position to the retracted position responsive to application of pressure to the apparatus without requiring actuation of the actuator.

14. An air conditioning system as claimed in claim 1 comprising a switch operable by a user to cause the at least one secondary vent to assume the retracted position.

15. An air conditioning system as claimed in claim 14 wherein the switch is operable by application of downward pressure on the apparatus.

16. An air conditioning system as claimed in claim 1 wherein the controller is configured to control the apparatus to remain in a deployed condition when air is no longer required to be delivered through the at least one secondary vent responsive to a value of at least one selected from an outside air temperature and a solar load on the vehicle.

17. An air conditioning system as claimed in claim 1 wherein the controller is configured to control the apparatus to remain in a deployed condition when air is no longer required to be delivered through the at least one secondary vent responsive to a value of an average flow rate of air through the at least one secondary vent since the apparatus was deployed.

18. An air conditioning system as claimed in claim 1 wherein the controller is configured to control the apparatus to switch between retracted and deployed conditions responsive to a value of required flow rate of air to a facial zone of the cabin.

19. An air conditioning system as claimed in claim 18 configured to provide a flow of air to the facial zone of the cabin when a required flow rate of air exceeds that which can be provided through the at least one primary vent operable to deliver air to the facial zone.

20. A motor vehicle comprising a system as claimed in claim 1.

21. A vehicle as claimed in claim 20 wherein the apparatus is coupled to a dashboard of the motor vehicle.

22. A method of delivering air to a zone of a motor vehicle, the method comprising:
 providing an air-conditioning system comprising a controller, at least one primary vent, and an air delivery apparatus for location in a dashboard of the motor vehicle, the apparatus comprising at least one secondary vent that moves between a retracted position in which the at least one secondary vent lies rearward of an A surface of the dashboard and a deployed position in which the at least one secondary vent is exposed for delivery of air to a zone of the vehicle;
 controlling the air-conditioning system to provide a flow of air from the at least one primary vent while the at least one secondary vent is in the retracted position; and
 when a required flow rate of air exceeds a predetermined flow rate, controlling the air conditioning system to provide the flow of air from the at least one primary vent and the at least one secondary vent in the deployed position.

* * * * *